(12) United States Patent
Neubrand

(10) Patent No.: US 6,588,824 B2
(45) Date of Patent: Jul. 8, 2003

(54) SPORT UTILITY VEHICLE HAVING A PARTIAL CONVERTIBLE TOP

(75) Inventor: Frank G. Neubrand, West Bloomfield, MI (US)

(73) Assignee: CTS Fahrzeug Dachsysteme GmbH, Rochester Hills, MI (US)

(*) Notice: Subject to any disclaimer, the term of this patent is extended or adjusted under 35 U.S.C. 154(b) by 0 days.

(21) Appl. No.: 09/999,316

(22) Filed: Oct. 31, 2001

(65) Prior Publication Data
US 2002/0079718 A1 Jun. 27, 2002

Related U.S. Application Data
(60) Provisional application No. 60/244,540, filed on Oct. 31, 2000.

(51) Int. Cl.[7] .............................. B60J 7/00; B62D 25/06
(52) U.S. Cl. ...................................... 296/99.1; 296/105
(58) Field of Search ........................ 296/26.04, 26.05, 296/99.1, 105

(56) References Cited

U.S. PATENT DOCUMENTS

| | | | | |
|---|---|---|---|---|
| 3,419,304 A | * | 12/1968 | Sangimino | |
| 4,659,136 A | * | 4/1987 | Martin et al. | |
| 4,784,429 A | * | 11/1988 | Hodges | |
| D310,806 S | * | 9/1990 | Hertzberg et al. | |
| 5,203,603 A | * | 4/1993 | Hertzberg et al. | |
| 5,725,273 A | | 3/1998 | Vernon et al. | |
| 5,765,903 A | | 6/1998 | Essig et al. | |
| 5,979,968 A | | 11/1999 | Essig et al. | |
| 6,003,936 A | | 12/1999 | Gordon | |
| 6,062,630 A | | 5/2000 | Taylor | |
| 6,149,217 A | * | 11/2000 | Plamondon | |
| 6,203,100 B1 | | 3/2001 | Gordon | |
| 6,237,981 B1 | | 5/2001 | Selleck | |
| 6,241,305 B1 | | 6/2001 | Troeger et al. | |

* cited by examiner

Primary Examiner—D. Glenn Dayoan
Assistant Examiner—Scott Carpenter
(74) Attorney, Agent, or Firm—Brooks & Kushman P.C.

(57) ABSTRACT

A convertible top for covering part of a passenger compartment of a land vehicle. The convertible top includes a retractable frame that retracts forwardly toward a permanent top section. The retractable frame is covered by a flexible cover and a rigid rear member moves longitudinally as the convertible top is moved between an extended and retracted position. The rigid rear member includes track followers that are moved in longitudinally extending tracks on the rear portion of the vehicle body. The retractable frame may be either a parallel bar expanding linkage, or telescoping slide supports.

12 Claims, 3 Drawing Sheets

SPORT UTILITY VEHICLE HAVING A PARTIAL CONVERTIBLE TOP

CROSS-REFERENCE TO RELATED APPLICATIONS

This application claims the benefit of U.S. provisional application Ser. No. 60/244,540 filed Oct. 31, 2000.

TECHNICAL FIELD

The present invention relates to a partial convertible top for a motor vehicle.

BACKGROUND ART

Convertible tops are increasing in popularity. Conventional convertible tops may be of the retractable hardtop type or a multiple bow, soft top type. Convertible tops are generally designed to encompass the entire roof of a sedan or coupe style vehicle.

Sport utility vehicles (SUV) have grown in popularity in recent years. Most sport utility vehicles have a permanent roof that extends from the windshield header to the rear window. The rear window is generally part of a lift gate or tailgate. Sport utility vehicles lack a trunk or stowage space for stowing a convertible top. Removable hardtops and zip-on or snap-on soft tops have been developed for SUV's, however, they are difficult to remove and reattach to the vehicle. Storage of removable hardtops and soft tops is also a problem.

There is a need for an easy-to-use, vehicle stored, convertible top for SUV's. The above problems and disadvantages are addressed by Applicant's invention as summarized below.

DISCLOSURE OF INVENTION

According to one aspect of the present invention a convertible top is provided for a land vehicle, such as a sport utility vehicle, that has a passenger compartment. The vehicle has both a permanent top section and a convertible top section. The permanent top section is located generally above the front seats of the vehicle with the convertible top being provided rearward of the permanent top. The convertible top includes a flexible cover and a selectively retractable frame. The retractable frame is in an extended position and a retracted position. A rigid rear member is moveably disposed on the vehicle for movement between a position near the rear of the vehicle when the convertible top is in its extended position and a position that is intermediate the length of the vehicle and proximate a rear edge of the permanent top when the convertible top is in its retracted position. The retractable frame is secured between the permanent top and the rear member.

The invention may also be viewed as a vehicle having a vehicle body that provides a passenger compartment. The vehicle includes a roof having a stationary portion permanently covering a first portion of a passenger compartment and a convertible portion selectively covering a second portion of the passenger compartment. The convertible portion has an extended position and a retracted position. The convertible portion comprises a retractable frame supporting a flexible cover over the second portion of the passenger compartment when the convertible top is in its extended position. The frame is retracted toward the stationary portion of the roof with the cover as the convertible top is retracted. A rear member is secured to the frame at an upper portion thereof on the back end of the frame. The front end of the frame is connected to the stationary portion of the roof on its front end. A track is disposed on the vehicle body at least partially below the convertible portion of the roof and extends longitudinally relative to the vehicle body. At least one track follower is provided on a lower portion of the rear member. The track follower is received by the track for guiding the lower end of the rear member as it is moved by the frame between the extended and retracted positions of the convertible portion.

According to another aspect of the invention, the retractable frame may be formed by right and left parallel bar expanding linkages. The expanding linkages each include a plurality of links connected on pivot pin. The parallel bar linkages on right and left sides of the vehicle are connected by laterally extending roof bows that support the flexible cover between the right and left parallel bar expanding linkages.

According to another aspect of the invention the frame may be formed by a right set and a left set of telescoping slide supports that retract to a position generally below the permanent top. The right and left set of telescoping slide supports may be formed by a plurality of telescoping bars that have rollers that engage others of the telescoping bar that facilitate extension and retraction of the right and left linkages.

The rear member is a relatively rigid panel member that is disposed behind the second portion of the passenger compartment when the convertible portion of the roof is in its extended position and is disposed between the first and second portions of the passenger compartment when the convertible roof is in its retracted position. The rear member may be secured to the permanent portion of the roof when the convertible is in its retracted position. The rear panel may have a removable window.

According to the present invention, a convertible top for a SUV is provided that may be stored on the vehicle adjacent the "C" pillar area of the vehicle. The "C" pillar is the roof support pillar rearward of the rear passenger door of a four door vehicle. If the invention is applied to a two door vehicle, the convertible top could be stored behind the doors adjacent the "B" pillar. The convertible top includes a retraction mechanism, or top stack, for moving the convertible top between a stowed position adjacent the "C" pillar of the vehicle and an extended position in which the top covers the rear portion of the passenger compartment of the vehicle.

According to one embodiment of the invention, the top stack retraction mechanism may use a scissor linkage, or a parallel bar expanding linkage, for supporting the top cover and roof bows. In an alternative embodiment, the retraction mechanism for the top stack may be a multi-segmented sliding track that supports the top cover and the roof bows.

According to one aspect of the invention, a hard shell rear section is connected to the distal ends of the top stack retraction mechanism. The hard shell rear section may be positioned over the tailgate of the vehicle in its extended position or positioned adjacent to the "B" or "C" pillar in the retracted position. The hard shell rear section is preferably formed of fiberglass or other rigid structural plastic.

According to another feature of the invention, removable windows may be provided on the side portions of the convertible top and in the hard shell rear section. The removable windows may be attached with zippers, velcro, or another removable attachment system.

These and other objects and advantages of the present invention will be readily understood by one of ordinary skill in the art upon review of the attached drawings in light of the following detailed description of two embodiments of the SUV soft top system of the present invention.

BEST MODE FOR CARRYING OUT THE INVENTION

Figure 1:
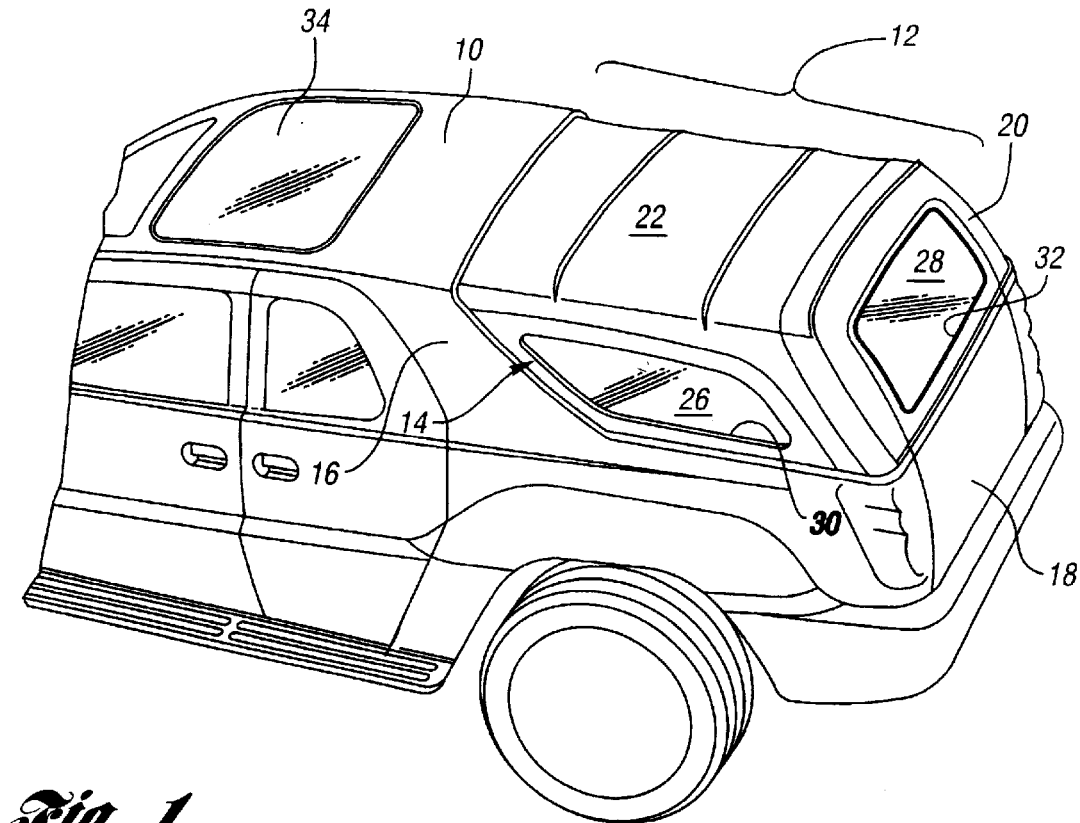
FIG. 1 is a fragmentary perspective view of a sport utility vehicle having a partial convertible top shown in the extended position.

Referring now to FIG. 1, a sport utility vehicle (SUV) 10 is shown to include a partial soft top assembly 12 that covers the rear portion 14 of the passenger compartment of the SUV 10. The soft top assembly 12 is connected behind the "C" pillar 16 of the SUV 10. The SUV 10 also includes a permanent roof that covers the front portion of the passenger compartment. A hard shell rear section 20 forms part of the soft top assembly 12. The soft top assembly 12 also includes a fabric cover 22 that extends between the hard shell rear portion 20 and the "C" pillar 16 of the SUV 10. A pair of side windows 26 and a rear window 28 are detachably secured to the soft top assembly 12 by means of side window zipper 30 and rear window zipper 32, respectively. The SUV 10 also preferably includes a sun roof 34 in the permanent roof that may be opened or closed as is well known in the art.

Figure 2:
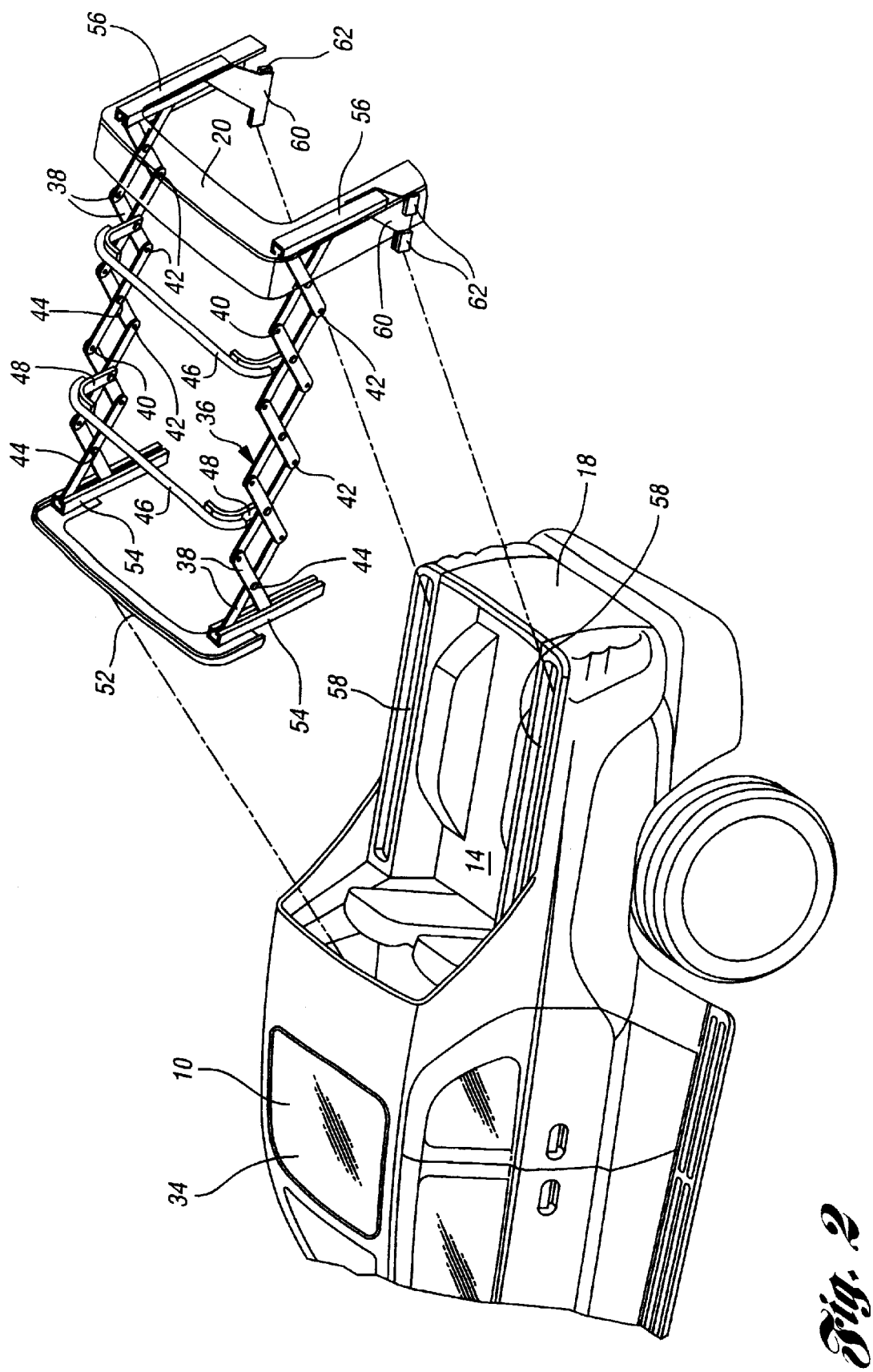
FIG. 2 is a perspective view of a sport utility vehicle having a parallel bar expanding linkage shown exploded from the vehicle.

Referring now to FIG. 2, a SUV 10 is shown with its soft top assembly 12 removed from the SUV 10, without the fabric cover 22 to reveal the scissor frame 36, or parallel bar expanding linkage, of the soft top assembly 12. The scissor frame 36 is formed by a plurality of scissor frame links 38. The scissor frame links 38 include an upper pivot connection 40 and a lower pivot connection 42 that scissor frame links 38 to other scissor frame links 38. A center pivot connection 44 is provided where two scissor frame links 38 cross each other. A plurality of roof bows 46 are connected by roof bow brackets 48 to some of the center pivot connections 44 of the scissor frame 36.

A retainer 52 forms a recessed front header and is secured to the "C" pillar. A scissor frame front track 54 is provided below the retainer 52 on the "C" pillar. The scissor frame front track 54 may include a power drive system, such as a hydraulic cylinder, worm screw drive, or electric rotary gear drive motor for driving the ends of the scissor frame 36 that are connected to the scissor frame front track 54 to extend and retract the scissor frame 36. A scissor frame rear track 56 is provided on right and left sides of the hard shell rear section. The ends of the scissor frame 36 that are connected to the scissor frame rear track 56 may be either power driven or passively guided within the scissor frame rear track 56.

Guide tracks 58 are provided on opposite sides of the SUV 10 adjacent the upper ends of the rear quarter panels of the SUV 10. The guide tracks 58 extend lengthwise on the SUV 10. A rear section track bracket 60 retains track followers 62. Track followers 62 are adapted to be received in the guide tracks 58. The track followers 62 may include bearings, rollers, or solid track followers that are received in the guide tracks 58.

Figure 3:
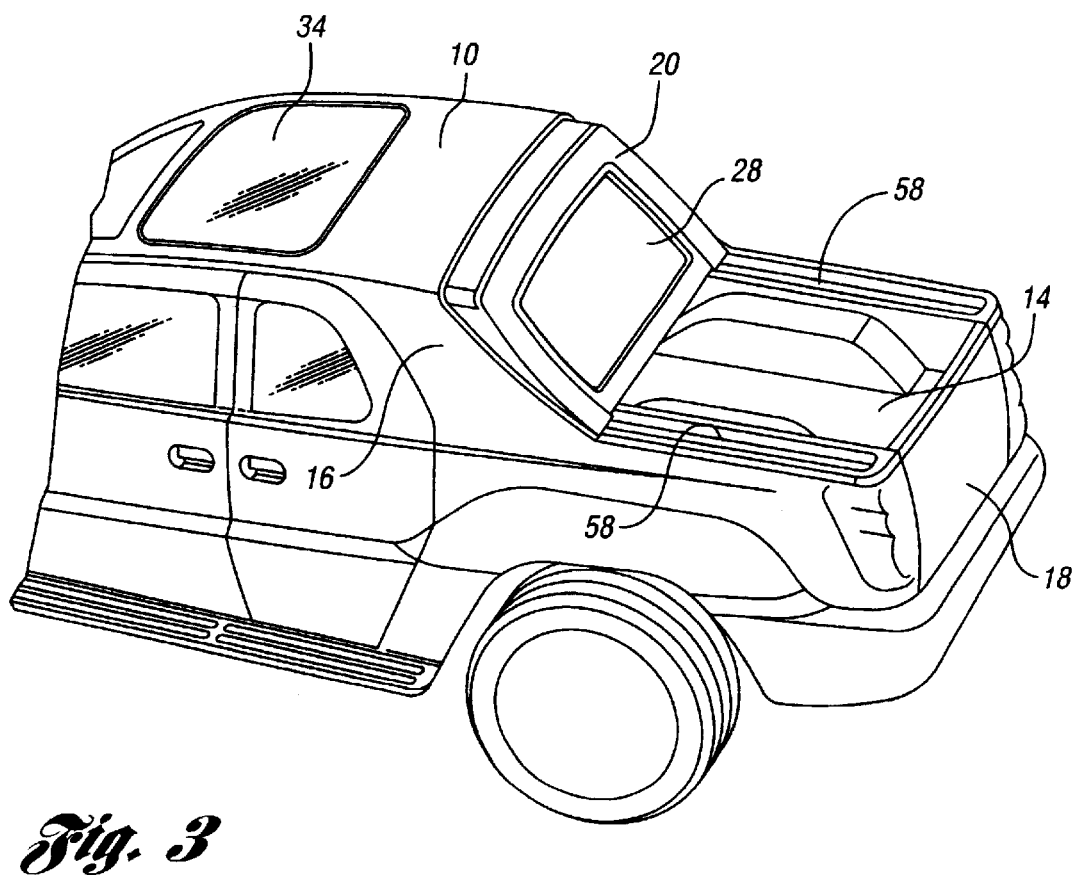
FIG. 3 is a fragmentary perspective view showing a sport utility vehicle having a partial convertible top shown in the retracted position.

Referring now to FIG. 3, the SUV 10 is shown with the soft top assembly 12 retracted and stowed adjacent the "C" pillar 16 of the SUV 10. The soft top assembly 12 when retracted is spaced from the tailgate 18. The hard shell rear section 20 is shown retracted up against the "C" pillar 16 of the SUV 10. As shown in FIG. 3, the rear window 28 is shown at it is attached to the hard shell rear section 20.

Figure 4:
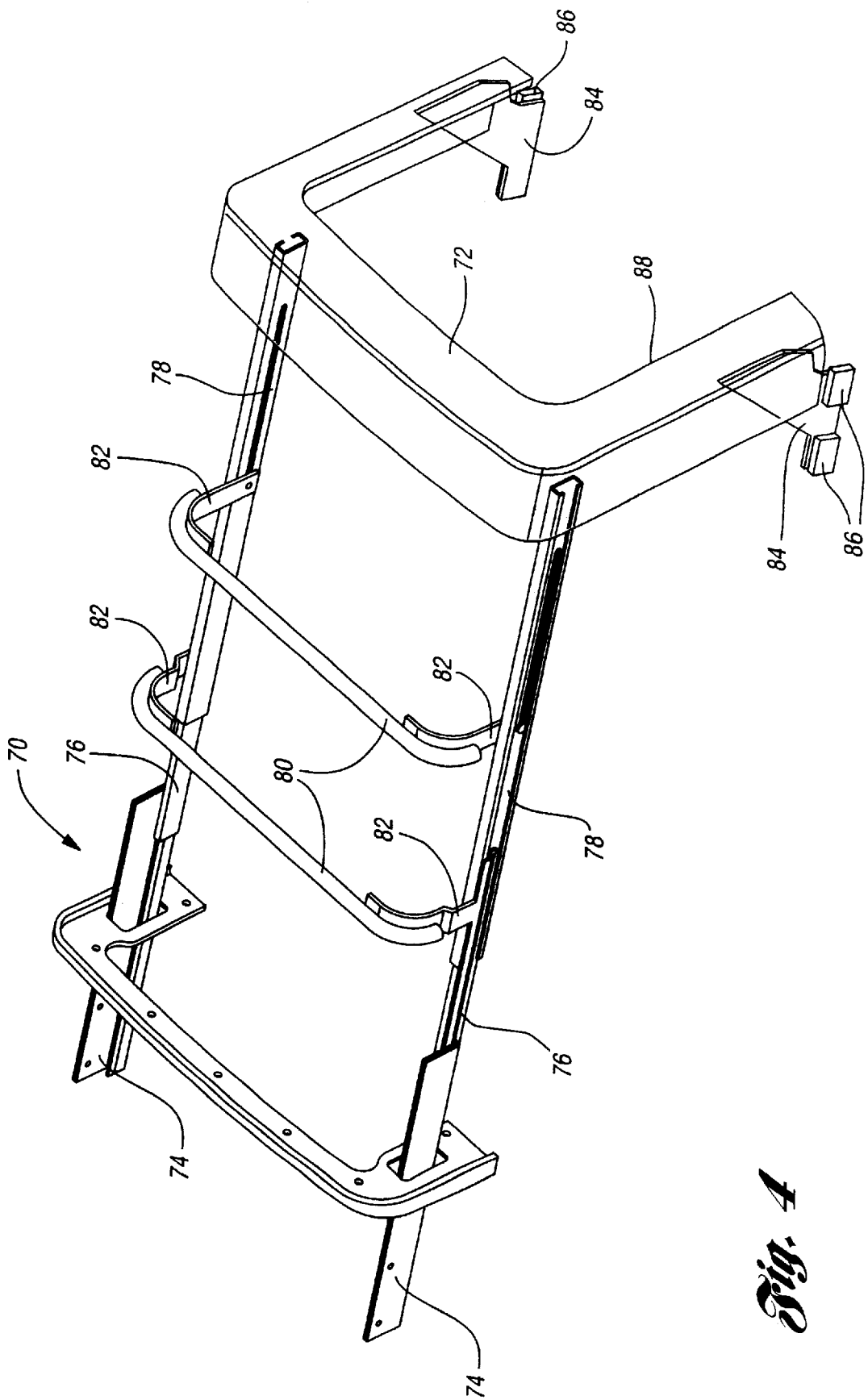
FIG. 4 is a perspective view of an alternative embodiment of a partial convertible top having a sliding track retractable frame.

Referring now to FIG. 4, an alternative embodiment of the present invention is shown wherein an alternative soft top assembly 70 is shown to include a hard shell rear section 72 and a body mounted channel 74. One or more intermediate slide track sections 76 are secured to the body mounted channel 74 and to a rear section slide track 78. The body mounted channel 74, intermediate slide track sections 76, and rear section slide track 78 are connected together to form an extensible track. Roof bows 80 are secured to the assembled slide track sections by roof bow brackets 82. The assembled slide track sections extend rearwardly from the "C" pillar 16 of an SUV 10.

Guide tracks 58 as described above with reference to FIG. 2 are provided at the belt line of the SUV 10 on opposite sides of the rear portion 14 of the SUV 10. Guide tracks 58 as shown in FIGS. 2 and 3 are adapted to receive track followers 86 that are supported by rear section track bracket 84 as shown in FIG. 4. Track brackets 84 support the lower portion of the hard shell rear section 72 for movement in the guide tracks 58. A rear window opening 88 is provided in the hard shell rear section 72. As shown in FIG. 4, no rear window 28 is disposed in the rear window opening 88, as it would appear when the window 28 is removed. Alternatively, the rear window 28 could be carried by the tail gate of the SUV 10.

It is anticipated that other extendable frame sections may be developed that could be incorporated in accordance with the present invention in a rear SUV convertible top system. Alternatively, the right and left linkages may each comprise the hydraulic cylinder having a rod that is extended and retracted by supplying and withdrawing hydraulic fluid from the cylinder. The embodiments of the SUV soft top system disclosed above are intended as examples. The scope of the invention is broader than the specific examples disclosed and the above description and drawings should not be used to limit the scope of the invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A convertible top for a land vehicle having a passenger compartment that is partially covered by the convertible top and partially covered by a permanent top, comprising:

a flexible cover;

a retractable frame supporting the cover in an extended position;

a rigid rear member movably disposed on the vehicle for movement between an extended position proximate the rear of the vehicle and a retracted position intermediate the length of the vehicle that is proximate a rear edge of the permanent top; and wherein the retractable frame is secured between the permanent top and the rear member and is formed by a right set and a left set of telescoping slide supports that retract to a position below the permanent top.

2. The convertible top of claim 1 wherein the permanent top is disposed over a set of front seats and the convertible top when extended is disposed over a set of rear seats.

3. The convertible top of claim 1 wherein the permanent top is disposed over a set of front seats and the convertible top when extended is disposed over a portion of the passenger compartment behind the front set of seats.

4. The convertible top of claim 1 wherein the right and left sets of telescoping slide'supports are connected by laterally extending roof bows.

5. The convertible top of claim 1 wherein the rear member includes right and left sets of track followers that are received by a right track and a left track, respectively, that extend longitudinally on right and left sides of the vehicle.

6. The convertible top of claim 1 wherein the convertible top has flexible right and left sidewall portions that are supported by the retractable frame.

7. The convertible top of claim 6 wherein the sidewall portions each have removable windows that are removed before the convertible top is moved to the retracted position.

8. The convertible top of claim 1 wherein the rigid rear member has a removable window.

9. A vehicle comprising:

a vehicle body;

a passenger compartment provided within the vehicle body;

a roof having a stationary portion permanently covering a first portion of the passenger compartment and a convertible portion selectively covering a second portion of the passenger compartment, the convertible portion having an extended position and a retracted position;

the convertible portion having a retractable frame supporting a flexible cover over a second portion of the passenger compartment when the convertible top is in the extended position, the frame being retracted toward the stationary portion with the cover as the convertible top is retracted, the retractable frame has a right linkage on the right side of the vehicle and a left linkage on the left side of the vehicle, wherein each linkage extends longitudinally and wherein the track has a right track on the right side of the vehicle and a left track on the left side of the vehicle, and wherein the track follower includes a right and a left track follower that are received by the right and left tracks, respectively, wherein the right and left linkages are a plurality of telescoping bars having rollers that engage others of the telescoping bars to facilitate extension and retraction of the right and left linkages;

a rear member secured to the frame, the frame being connected to an upper portion of the rear member on its back end and being connected to the stationary portion of the roof on its front end; and a track disposed on the vehicle body at least partially below the convertible portion of the roof and extending longitudinally on the vehicle body, and at least one track follower provided on a lower portion of the rear member, the track follower being received by the track for guiding the lower end of the rear member as it is moved by the frame between its extended and retracted positions.

10. The vehicle of claim 9 wherein the right and left linkages are connected by at least one laterally extending bow that supports the cover between the right and left linkages.

11. The vehicle of claim 9 wherein the rear member is a rigid panel member that is disposed behind the second portion of the passenger compartment when the convertible portion of the roof is in its extended position and is disposed between the first and second portions of the passenger compartment when the convertible roof is in its retracted position.

12. The vehicle of claim 11 wherein the rear member is secured to the permanent portion of the roof when the convertible roof is in its retracted position.

* * * * *